United States Patent
Williams et al.

[11] Patent Number: 6,019,026
[45] Date of Patent: Feb. 1, 2000

[54] SELF-CENTERING MOTOR

[75] Inventors: Daniel E. Williams, West Lafayette; Jonathan A. Lewis, Cutler, both of Ind.

[73] Assignee: TRW Inc., Lyndhurst, Ohio

[21] Appl. No.: 09/094,798

[22] Filed: Jun. 15, 1998

[51] Int. Cl.[7] .............................. F01B 7/00; F15B 11/00; F16D 31/02

[52] U.S. Cl. ................................ 92/62; 92/13.6; 91/510; 60/406

[58] Field of Search ..................................... 92/13.4, 13.6, 92/51, 61, 62, 65, 66; 91/170 R, 172, 173, 508, 509, 510; 60/404, 405, 406

[56] References Cited

U.S. PATENT DOCUMENTS

| | | | |
|---|---|---|---|
| 3,312,146 | 4/1967 | Quere et al. | 92/62 X |
| 3,653,298 | 4/1972 | Bilodeau | 91/306 |
| 5,014,602 | 5/1991 | Iwata | 92/51 X |
| 5,577,436 | 11/1996 | Kimbara | 91/170 R X |

*Primary Examiner*—John E. Ryznic
*Attorney, Agent, or Firm*—Tarolli, Sundheim, Covell, Tummino & Szabo L.L.P.

[57] ABSTRACT

A self-centering motor (16) includes a piston (130) which is disposed in a housing (112) and is movable in opposite directions from a centered condition. A pair of centering members (160 and 162) are disposed in the housing (112) to effect movement between the piston (130) and the housing toward the centered condition upon the occurrence of a predetermined condition, such as failure of a pump (44) to supply fluid under pressure. The members (160 and 162) which effect movement of the piston (130) to the centered condition are normally disposed in an overlapping relationship which enables the motor (16) to have a compact construction. In one embodiment of the invention, the members (160 and 162) which effect movement between the piston (130) and the housing (112) toward the centered condition include an inner centering member (162) and a cylindrical outer centering member (160) which extends around the inner centering member.

6 Claims, 5 Drawing Sheets

SELF-CENTERING MOTOR

BACKGROUND OF THE INVENTION

The present invention relates to a new and improved motor and more specifically to a motor which is self-centering upon the occurrence of a predetermined operating condition, such as a failure of a pump to supply fluid under pressure.

A known self-centering motor includes a piston which is enclosed by a housing. A piston rod has a first section which is connected wit h the piston and extends in one direction from the housing. The piston rod includes a second section which is connected with the piston and extends in the opposite direction from the housing.

The known self-centering motor includes a pair of sleeves are slidably mounted in the housing on opposite sides of the piston. One sleeve is mounted on the first section of the piston rod and a second sleeve is mounted on the second section of the piston rod. Upon the occurrence of a p redetermined condition, the two sleeves are moved toward each other and the piston to thereby move the piston to a centered condition relative to the housing.

Due to the relatively long length of this known self-centering motor, difficulty may be encountered in using the motor in situations where there is a limited amount of space.

SUMMARY OF THE INVENTION

The present invention provides a new and improved self-centering motor which is relatively short in overall length and can be utilized in locations where there is a limited amount of space. The self-centering motor includes a pair of members which effect relative movement between a piston and housing of the motor. The members operate the motor to a centered condition upon the occurrence of a predetermined operating condition, such as a failure of a pump to supply fluid under pressure to the motor. Although the self-centering motor may advantageously be utilized in many different environments, it is believed that it will be particularly advantageous to utilize the improved motor of the present invention to steer rear wheels of a vehicle.

BRIEF DESCRIPTION OF THE DRAWINGS

Other features and advantages of the present invention will become apparent to those skilled in the art to which the present invention relates from a reading of the following detailed description with reference to the accompanying drawings, in which.

DESCRIPTION OF ONE SPECIFIC PREFERRED EMBODIMENT OF THE INVENTION

General Description

Figure 1:
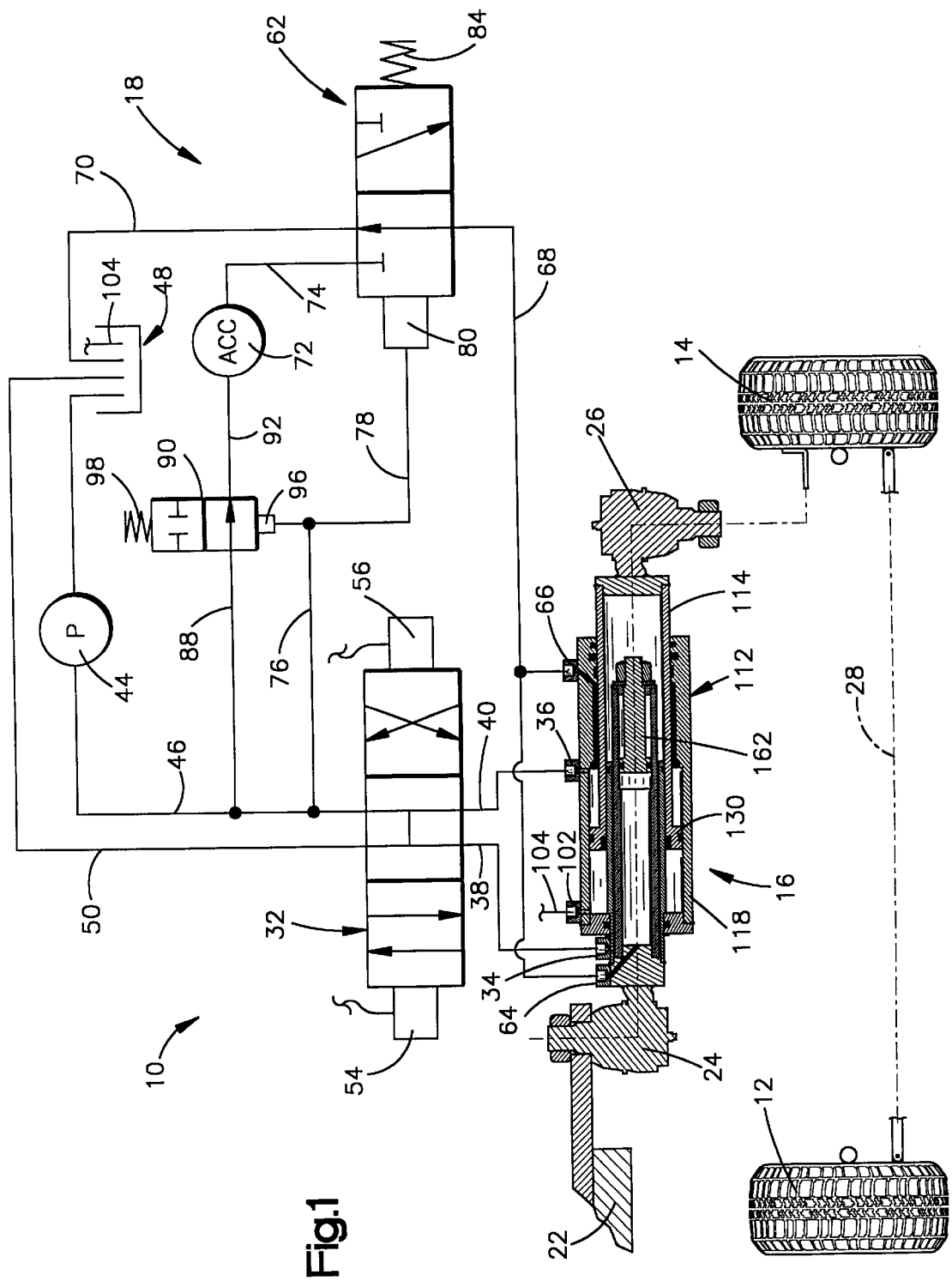
FIG. 1 is a schematic illustration of an apparatus for steering the rear wheels of a vehicle and includes an improved self-centering motor constructed in accordance with the present invention.

An apparatus 10 for steering rear wheels 12 and 14 of a vehicle is illustrated schematically in FIG. 1. The apparatus 10 includes an improved self-centering motor 16 and a motor control system 18.

The self-centering motor 16 is connected with a frame 22 of the vehicle by a mounting joint 24. An actuator joint 26 connects the self-centering motor 16 with the rear wheel 14 of the vehicle. A linkage 28 extends between the rear wheels 12 and 14 so that both wheels are moved by operation of the self-centering motor 16. Although the improved self-centering motor 16 has been illustrated in FIG. 1 in association with steerable rear wheels 12 and 14 of a vehicle, it should be understood that the self-centering motor could be utilized in association with many different types of devices other than the steerable rear wheels of a vehicle.

The motor control system 18 controls operation of the self-centering motor 16. The motor control system 18 includes a motor control valve 32. The motor control valve 32 is actuatable to effect operation of the self-centering motor 16 between a centered or initial condition of FIG. 2, a retracted condition of FIG. 3, and an extended condition of FIG. 4.

The motor control valve 32 (FIG. 1) is connected with motive fluid ports 34 and 36 of the self-centering motor 16 by conduits 38 and 40. The motor control valve 32 is connected with a hydraulic fluid pump 44 by a conduit 46. The motor control valve 32 is also connected with a hydraulic fluid reservoir or drain 48 by a conduit 50. The hydraulic fluid in the reservoir 48 is maintained at a relatively low pressure which is slightly greater than atmospheric pressure.

A pair of solenoids 54 and 56 are provided to operate the motor control valve 32 from an initial condition in which the conduits 38, 40, 46 and 50 are connected in fluid communication with each other to either one of two actuated conditions. Upon energization of the solenoid 54, the motor control valve 32 is moved toward the right (as viewed in FIG. 1) to connect the pump 44 in fluid communication with the motive fluid port 36 and to connect the reservoir 48 in fluid communication with the motive fluid port 34. Upon energization of the solenoid 56, the motor control valve 32 is shifted toward the left to connect the pump 44 in fluid communication with the motive fluid port 34 and to connect the reservoir 48 in fluid communication with the motive fluid port 36.

Figure 2:
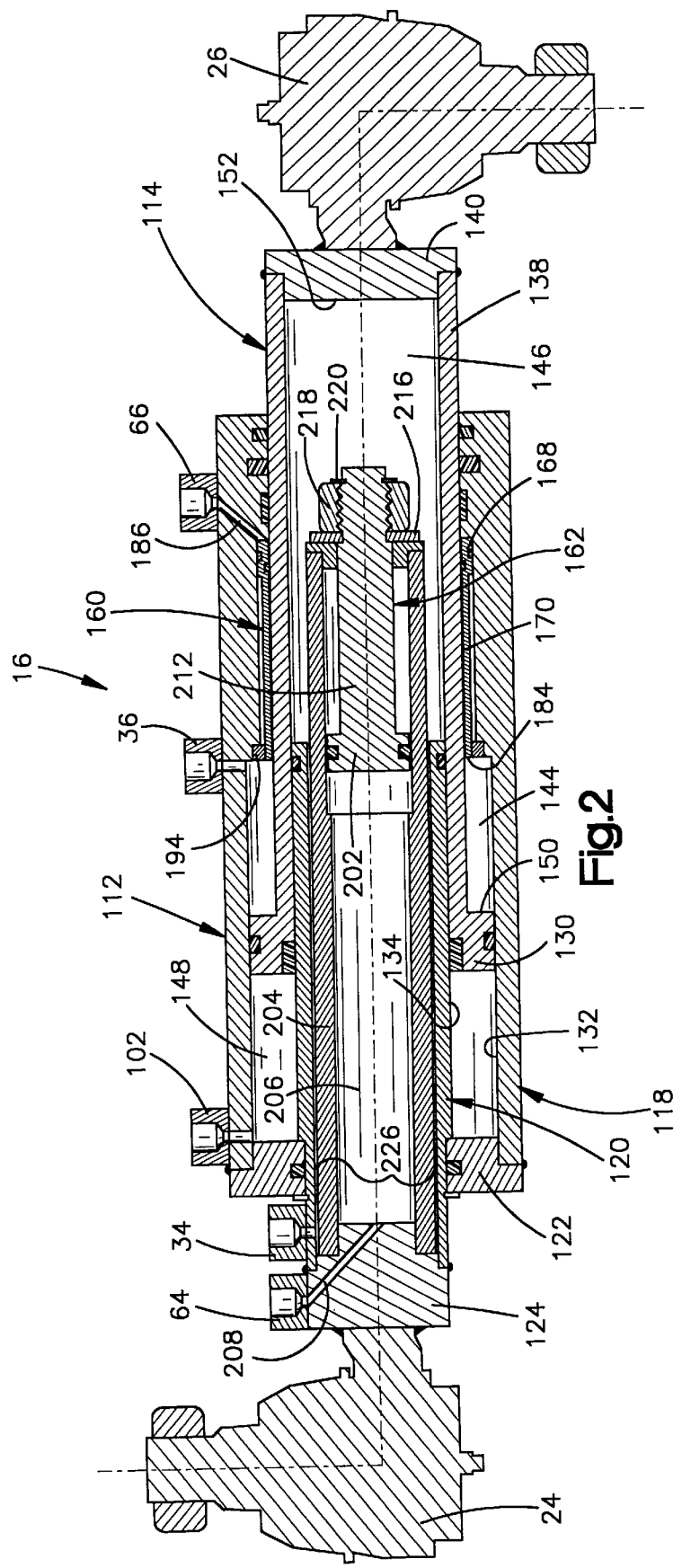
FIG. 2 is an enlarged sectional view of the self-centering motor of FIG. 1, illustrating the motor in a centered condition.
Figure 3:
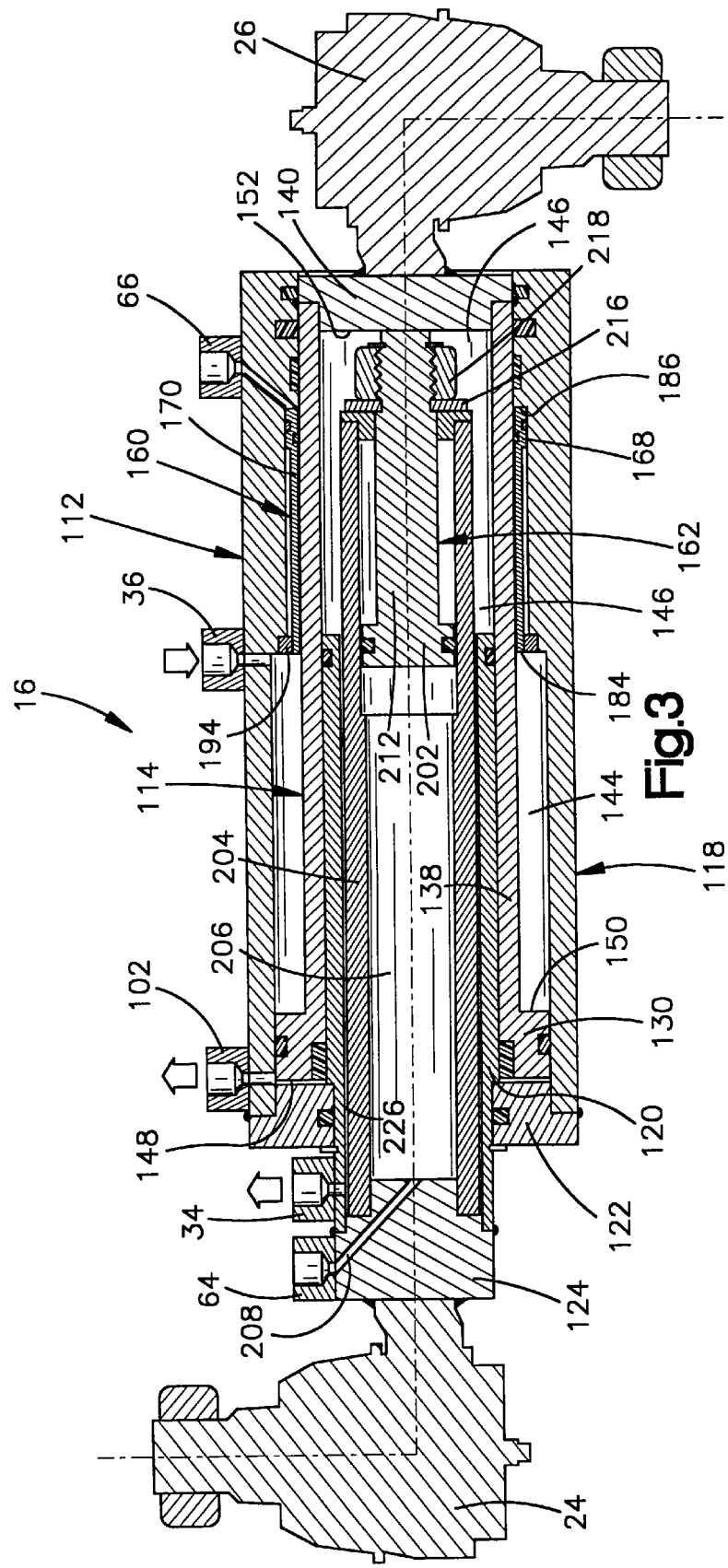
FIG. 3 is a sectional view, generally similar to FIG. 2, illustrating the self-centering motor in a retracted condition.
Figure 4:
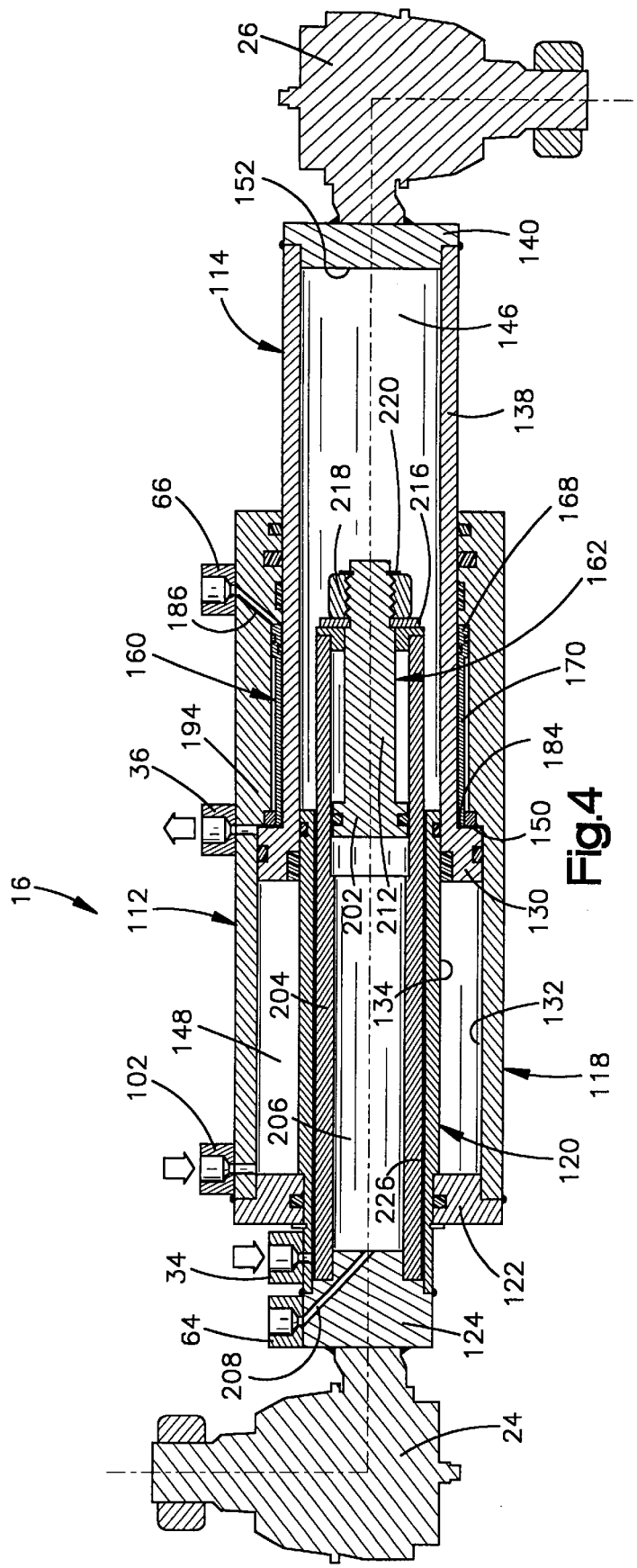
FIG. 4 is sectional view, generally similar to FIGS. 2 and 3, illustrating the self-centering motor in an extended condition.

A center control valve 62 (FIG. 1) effects operation of the self-centering motor 16 from either the retracted condition of FIG. 3 or the extended condition of FIG. 4 to the initial or centered condition of FIG. 2. The center control valve 62 is connected with centering fluid ports 64 and 66 of the self-centering motor 16 (FIG. 1) by a conduit 68. The center control valve 62 is connected with reservoir 48 by a conduit 70. In addition, the center control valve 62 is connected with an accumulator 72 by a conduit 74.

During normal operation of the pump 10, high pressure fluid is conducted from the conduit 46 through conduits 76 and 78 (FIG. 1) to a pressure chamber 80 in the center control valve 62. Fluid pressure in the chamber 80 urges the center control valve 62 to the actuated condition shown in FIG. 1 against the influence of a biasing spring 84.

During normal operation of the pump 44, the accumulator 72 is charged with hydraulic fluid conducted from the conduit 46 through a conduit 88, pressure responsive valve 90 and a conduit 92. The pressure responsive valve 90 is urged to the open condition illustrated in FIG. 1 by fluid pressure conducted from the conduit 46 through the conduit 76 to a pressure chamber 96 at one end of the pressure responsive valve 90. During normal operation of the pump 44, the fluid pressure in the chamber 96 is effective to hold the pressure responsive valve 90 in the open condition against the influence of a biasing spring 98. The self-centering motor 16 has a drain port 102 which is continuously connected with the reservoir 48 through a conduit 104.

When the self-centering motor 16 is to be operated from the centered or initial condition of FIG. 2 toward the retracted condition of FIG. 3 to turn the steerable rear wheels 12 and 14 of the vehicle, the solenoid 54 (FIG. 1) is energized. Energization of the solenoid 54 moves the motor control valve 32 toward the right (as viewed in FIG. 1). This results in high pressure fluid from the pump 44 being directed to the motive fluid port 36 of the self-centering motor 16. The motive fluid port 34 of the self-centering motor 16 is connected with the reservoir 48 through the actuated motor control valve 32. At this time, the center control valve 62 is in the actuated condition illustrated in FIG. 1 in which the centering fluid ports 64 and 66 are connected with the reservoir 48.

When the self-centering motor 16 is to be operated from the centered condition of FIG. 2 toward the extended condition of FIG. 4 to turn the steerable rear wheels 12 and 14 of the vehicle, the solenoid 56 is energized by the vehicle control system. Energization of the solenoid 56 moves the motor control valve 32 toward the left from the unactuated condition of FIG. 1. This results in high pressure fluid from the pump 44 being directed to the motive fluid port 34 of the self-centering motor 16. The motive fluid port 36 of the self-centering motor 16 is connected with the reservoir 48 through the motor control valve 32. This results in the self-centering motor 16 being operated from the centered or initial condition of FIG. 2 toward the extended condition of FIG. 4.

Upon a failure of the pump 44 (FIG. 1) to supply fluid under pressure to the motor control valve 32 and accumulator 72, the pressure responsive valve 90 is operated to block fluid flow from the accumulator 72 back to the pump 44. Thus, upon a failure of the pump 44, the fluid pressure in the chamber 96 of the pressure responsive valve 90 decreases. This enables the spring 98 to operate the pressure responsive valve 90 to a closed condition blocking fluid flow between the conduits 88 and 92.

Upon a failure of the pump 44 to supply fluid under pressure, the center control valve 62 is operated to effect operation of the self-centering motor 16 from the retracted condition of FIG. 3 or the extended condition of FIG. 4 back to the centered or initial condition of FIG. 2. Upon failure of the pump 44 (FIG. 1) to produce fluid under pressure, the fluid pressure in the chamber 80 of the center control valve 62 is decreased. Decreasing the fluid pressure in the chamber 80 enables the spring 84 to operate the center control valve 62. Operation of the center control valve 62 by the spring 84 connects the accumulator 72 in fluid communication with the centering fluid ports 64 and 66 of the self-centering motor 16. The high pressure fluid from the accumulator 72 is conducted through the actuated center control valve 62 to the self-centering motor 16 to effect operation of the self-centering motor to the centered or initial condition of FIG. 2.

Self-centering Motor

The self-centering motor 16 has a relatively compact construction which enables it to be utilized in environments where there is a minimum of space available for the motor. In addition, the compact construction of the self-centering motor 16 facilitates minimizing the weight of the motor.

The self-centering motor 16 includes a housing 112 (FIG. 2) which encloses a piston assembly 114. The housing 112 includes an outer cylinder 118 connected with the mounting joint 24. An inner cylinder 120 is disposed in a coaxial relationship with the outer cylinder 118. An annular first end cap 122 is disposed in a coaxial relationship with the inner and outer cylinders 118 and 120 and fixedly interconnects the inner and outer cylinders. A circular second end cap 124 is connected with the inner cylinder 120 and the mounting joint 124.

Fluid ports are mounted on the outer cylinder 118, inner cylinder 120, and second end cap 124. Thus, the centering fluid port 66 (FIG. 2), motive fluid port 36, and drain port 102 are mounted on the outer cylinder 118. The motive fluid port 34 is mounted on the inner cylinder 120. The centering fluid port 64 is mounted on the second end cap 124.

The piston assembly 114 is disposed in a coaxial relationship with the inner and outer cylinders 118 and 120. The piston assembly 114 includes an annular piston 130 which is disposed in sealing engagement with a cylindrical inner side surface 132 on the outer cylinder 118 and a cylindrical outer side surface 134 on the inner cylinder 120. The annular piston 130 is disposed in a coaxial relationship with the outer cylinder 118 and inner cylinder 120.

A hollow cylindrical piston rod 138 is integrally formed as one piece with the piston 130. The tubular piston rod 138 is disposed in a coaxial relationship with the outer cylinder 118 and inner cylinder 120. A piston rod end cap 140 blocks an axially outer end of the tubular piston rod 138. The actuator joint 26 is connected with the piston rod end cap 140.

The housing 112 and piston assembly 114 cooperate to define a pair of chambers which receive motive fluid. Thus, a cylinder motor chamber 144 (FIG. 2) is formed between the piston 130, piston rod 138 and outer cylinder 118 of the self-centering motor 16. A piston rod chamber 146 is disposed in the piston rod 138. The piston rod chamber 146 is defined by the piston rod 138, the piston rod end cap 140, the inner cylinder 120 and the second end cap 124. A low pressure chamber 148 is provided between the piston 130 and first end cap 122. The low pressure chamber 148 is continuously connected with reservoir through the drain port 102.

The piston rod chamber 146 and cylinder motor chamber 144 are of the equal area type. This is because an annular motive fluid pressure surface 150 on the piston 130 has an area which is the same as the area of a circular motive fluid pressure surface 152 on the piston rod end cap 140. Since the motive fluid pressure surfaces 150 and 152 have the same area, when a predetermined fluid pressure is applied against the piston 130, the resulting force is the same as when the predetermined fluid pressure is applied against the motive fluid pressure surface 152 on the piston rod end cap 140.

In accordance with a feature of the present invention, an outer centering member 160 and an inner centering member 162 (FIG. 2) are provided to operate the motor 16 from either the retracted condition (FIG. 3) or the extended condition (FIG. 4) to the centered condition (FIG. 2) upon failure of the pump 44 (FIG. 1) to deliver fluid under pressure. During normal operation of the self-centering motor 16, the sequential directing of fluid pressure to the cylinder motor chamber 144 (FIG. 2) and piston rod chamber 146 by the motor control valve 32 applies fluid pressure against the outer and inner centering members 160 and 162 to urge them to the retracted positions shown in FIG. 2. Fluid pressure in the cylinder motor chamber 144 urges the outer centering member 160 to the retracted position shown in FIG. 2. Similarly, fluid pressure in the piston rod chamber 146 urges the inner centering member 162 to the retracted position of FIG. 2. When the tubular outer centering member 160 and the inner centering member 162 are in the retracted positions of FIG. 2, they are disposed in an overlapping relationship. Thus, the outer centering member 160 is disposed in a coaxial relationship with and extends around the outer centering member 162.

Upon operation of the motor control valve 32 to effect operation of the self-centering motor 16 from the centered or initial condition of FIG. 2 to the retracted condition of FIG. 3, the piston 130 is moved toward the left (as viewed in FIGS. 2 and 3) by high pressure fluid in the cylinder motor chamber 144. As the self-centering motor 16 is operated to the fully retracted condition of FIG. 3, the outer centering member 160 and inner centering member 162 remain stationary relative to the outer cylinder 119 in an overlapping relationship. Similarly, during operation of the self-centering motor 16 from the centered or initial condition of FIG. 2 to the fully extended condition of FIG. 4, the outer centering member 160 and inner centering member 162 remain stationary relative to the outer cylinder 118 in an overlapping relationship.

The outer centering member 160 (FIGS. 2 and 5) is a cylindrical sleeve which is disposed between the piston rod 138 and the outer cylinder 118. The outer centering member 160 has a cylindrical head end portion 168 (FIGS. 2 and 5) and a cylindrical body portion 170. The cylindrical body portion 170 is integrally formed as one piece with the head end portion 168.

The outer centering member 160 has a cylindrical inner side surface 172 (FIG. 5) which extends throughout the length of both the body portion 170 and head end portion 168. The head end portion 168 has a cylindrical outer side surface 174 with a greater diameter than a cylindrical outer side surface 176 of the body portion 170. The cylindrical side surfaces 172, 174 and 176 are disposed in a coaxial relationship.

When the outer centering member 160 is in the retracted position of FIG. 2, an axially outer end of the body portion 170 is exposed to the fluid pressure in the cylinder motor chamber 144. When high pressure fluid is conducted through the motor fluid port 36 to the cylinder motor chamber 144, an annular end surface 184 on the body portion 170 of the outer centering member 160 is exposed to the high fluid pressure in the cylinder motor chamber. This results in an annular end surface 186 (FIG. 5) on the head end portion 168 being pressed firmly against an annular end surface 188 of the outer stop chamber 180, in the manner illustrated in FIG. 2.

Figure 5:
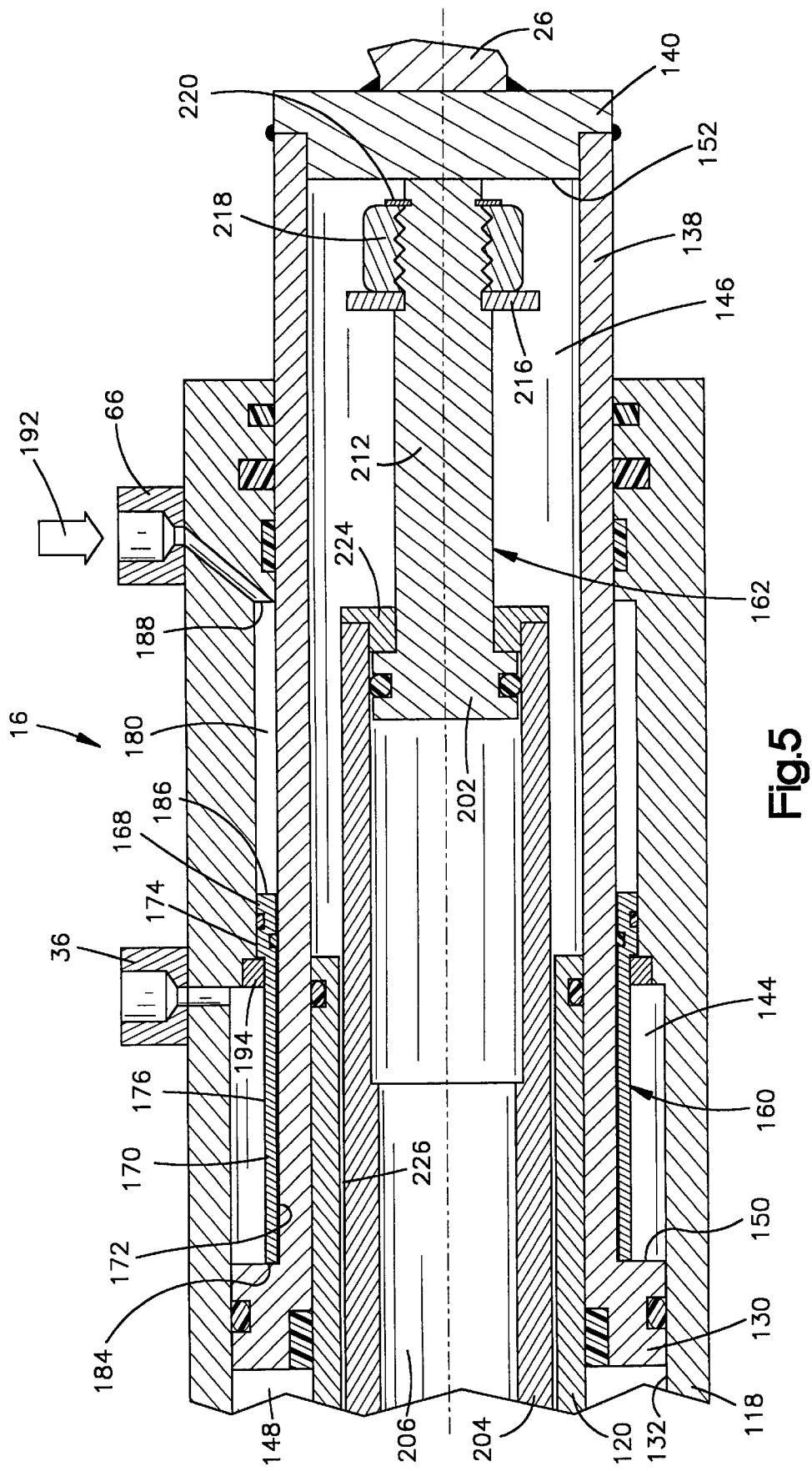
FIG. 5 is an enlarged fragmentary sectional view of a portion of the self-centering motor of FIGS. 1–4 and illustrating the relationship between inner and outer center stops after they have operated the self-centering motor to a centered condition.

When the center control valve 62 is operated to port fluid under pressure to the centering fluid port 66, in the manner indicated schematically by an arrow 192 in FIG. 5, fluid pressure is applied against the annular end surface 186 on the head end portion 168 of the outer centering member 160. This results in a force which presses the end surface 184 on the body portion 170 against the motive fluid pressure surface 150 on the piston 130. The head end portion 168 of the outer centering member 160 engages an annular stop ring 194 to limit leftward (as viewed in FIG. 5) movement of the outer centering member.

The inner centering member 162 includes a cylindrical head end portion 202 which is disposed in a cylindrical tubular center cylinder 204. The center cylinder 204 is fixedly connected to the second end cap 124 (FIG. 2) and is disposed in a coaxial relationship with the outer cylinder 118 and inner cylinder 120. A pressure chamber 206 in the center cylinder 204 is connected in fluid communication with the centering fluid port 64 by a passage 208 formed in the end cap 124 (FIG. 2).

The inner centering member 162 (FIG. 5) includes a solid cylindrical rod portion 212. An annular stop washer 216 is held onto an outer end of the rod portion 212 by a stop nut 218 and a retainer ring 220. An axially outer end of the center cylinder 204 is closed by an annular end cap 224. There is no seal between the end cap 224 and the rod portion 212 of the inner centering member 162. Therefore, fluid is conducted into the outer end portion of the pressure chamber 206 when the inner centering member 162 is in the retracted position of FIG. 2.

Upon operation of the motor control valve 32 to extend the self-centering motor 16, fluid pressure is conducted to the motor fluid port 34. This fluid pressure is conducted along a thin cylindrical passage 226 disposed between an outer side surface of the center cylinder 204 and an inner side surface of the inner cylinder 120. This results in the piston rod chamber 146 being pressurized. The pressure in the piston rod chamber 146 is applied against the rod portion 212 of the inner centering member 162 and is conducted into the outer end portion of the pressure chamber 206. At this time, the inner end of the pressure chamber 206 is connected in fluid communication with the low pressure reservoir through the centering fluid port 164 and the center control valve 62 (FIG. 1). Therefore, the inner centering member 162 is moved to the retracted position shown in FIG. 2 by the fluid pressure in the piston rod chamber 146.

When the center control valve 62 is operated to port fluid under pressure to the centering fluid port 64 (FIG. 1), fluid pressure is applied against the head end portion 202 (FIG. 5) of the inner centering member 162. This results in a force which presses the rod portion 212 of the inner centering member 162 against the motive fluid pressure surface 152 on the piston rod end cap 140. The head end portion 202 of the inner centering member 162 engages the end cap 224 (FIG. 5) on the center cylinder 204 to limit rightward (as viewed in FIG. 5) movement of the inner centering member.

The outer and inner centering members 160 and 162 move in opposite directions through the same distance from the retracted condition of FIG. 2 to the extended condition of FIG. 5 to operate the motor 16 to the centered condition upon actuation of the center control valve 62. The area of the annular end surface 186 on the head end portion 168 of the outer centering member 160 is equal to the area of the circular head end portion 202 on the inner centering member 162. Therefore, when equal pressures are conducted from the center control valve 62 (FIG. 1) to the centering fluid ports 64 and 66, equal and opposite forces are applied against the outer and inner centering members 160 and 162.

During normal operation of the pump 44, the outer and inner centering members 160 and 162 are disposed in overlapping relationship illustrated in FIGS. 2, 3 and 4. However, upon a failure of the pump 44 and actuation of the centering members 160 and 162 to operate the motor 16 to the centered condition of FIG. 5, the outer and inner centering members move in axially opposite directions relative to each other. This results in the outer and inner centering members 160 and 162 moving into the nonoverlapping relationship illustrated in FIG. 5.

Operation

During normal operation of the pump 44 (FIG. 1) the center control valve 62 connects the centering fluid ports 64 and 66 of the self-centering motor 16 with the reservoir 48. When the self-centering motor 16 is to be operated toward the retracted condition of FIG. 3, the solenoid 54 is energized and high pressure fluid is directed to the motive fluid port 36 and cylinder motor chamber 144 (FIG. 2). This fluid pressure causes the piston 130 to move leftward (as viewed in FIG. 2) toward the retracted condition shown in FIG. 3. As this occurs, the fluid pressure in the cylinder motor chamber 144 urges the outer centering member 160 to the retracted position shown in FIGS. 2 and 3. As the piston 130 moves leftward, fluid is exhausted through the drain port 102 to the reservoir 104. In addition, fluid is conducted back to the reservoir 48 from the contracting piston rod chamber 146 through the motive fluid port 34 and motor control valve 32.

When the motor 16 is to be operated in the opposite direction, that is toward the extended condition of FIG. 4, the solenoid 56 (FIG. 1) is energized. This shifts the motor control valve 32 toward the left (as viewed in FIG. 1). High pressure fluid from the pump 44 is then directed by the motor control valve 32 to the motive fluid port 34. This high pressure fluid causes the piston rod chamber 146 to expand. As this occurs, fluid is exhausted from the contracting cylinder motor chamber 144. At this time, fluid flows, at a low pressure, from the reservoir 48 through the conduit 104 to the drain port 102 and into the expanding low pressure chamber 148 between the piston 130 and first end cap 122.

Upon a failure of the pump 44 (FIG. 1) to pump fluid, the pressure conducted to the chamber 96 in the pressure responsive valve 90 decreases. This enables the spring 98 to operate the pressure responsive valve 90 to the closed condition. At the same time, the fluid pressure in the chamber 80 of the center control valve 62 decreases. The spring 84 then operates the center control valve 62 to an actuated condition in which the accumulator 72 is connected in fluid communication with the centering fluid ports 64 and 66.

The fluid pressure from the centering fluid port 66 is applied against the head end portion 168 (FIG. 2) of the outer centering member 160. This moves the outer centering member 160 leftward toward the extended condition shown in FIG. 5. In addition, the fluid pressure from the centering fluid port 64 is applied against the head end portion 202 of the inner centering member 162. This moves the inner centering member 162 rightward toward the extended condition shown in FIG. 5. If the piston 130 is offset to the right (as viewed in FIGS. 2 and 5) of the centered or initial position shown in FIG. 2, force applied by the outer centering member 160 against the piston 130 moves the piston toward the left to the centered position shown in FIG. 2. If the piston 130 is offset to the left (as viewed in FIGS. 2 and 5) of the centered or initial position shown in FIG. 2, force applied by the inner centering member 162 against the piston rod end cap 140 moves the piston 130 toward the right to the centered condition shown in FIG. 2.

The pressure transmitted from the accumulator 72 through the center control valve 62 and applied against the outer centering member 160 and inner centering member 162 maintains the self-centering motor 16 in the centered or initial condition illustrated in FIGS. 2 and 5. At this time, the outer centering member 160 is axially offset to the left (as viewed in FIG. 5) of the inner centering member 162. Therefore, the overlapping relationship between the outer and inner centering members 160 and 162 has been eliminated.

When the pump 44 again begins to operate, pressure is re-established in the pressure chamber 80 (FIG. 1) of the center control valve 62. This operates the center control valve 62, against the influence of the spring 84, to again connect the centering fluid ports 64 and 66 with the reservoir 48. Once this occurs, the motor control valve 32 can be operated to actuate the motor 16 to either the retracted condition of FIG. 3 or the extended condition of FIG. 4.

From the above description of the invention, those skilled in the art will perceive improvements, changes and modifications. Such improvements, changes and modifications within the skill of the art are intended to be covered by the appended claims.

Having described the invention, the following is claimed:

1. An apparatus comprising:
a housing;
a piston disposed within said housing, said piston and housing being relatively movable in a first direction from a centered condition under the influences of fluid pressure and being relatively movable in a second direction from a centered condition under the influence of fluid pressure;
a first member disposed in said housing for effecting relative movement between said piston and housing in the first direction toward the centered condition upon occurrence of a predetermined condition; and
a second member disposed in said housing for effecting relative movement between said piston and housing in the second direction toward the centered condition upon occurrence of a predetermined condition, said first and second members being disposed in an overlapping relationship during at least a portion of the relative movement between said piston and housing.

2. An apparatus as set forth in claim 1 wherein said first and second members are spaced from each other in such a manner as to eliminate the overlapping relationship between said first and second members upon relative movement between said piston and housing to the centered condition under the influence of one of said first and second members.

3. An apparatus as set forth in claim 1 wherein said first member is moved toward said piston to effect relative movement between said piston and housing in the first direction toward the centered condition and said second member is moved away from said piston to effect relative movement between said piston and housing in the second direction.

4. An apparatus as set forth in claim 1 wherein said first member has a surface against which fluid pressure is applied to urge said first member to move in a direction away from said second member to effect relative movement between said piston and housing in the first direction toward the centered condition and said second member has a surface against which fluid pressure is applied to urge said second member to move in a direction away from said first member to effect relative movement between said piston and housing in the second direction toward the centered condition.

5. An apparatus as set forth in claim 1 further including a piston rod connected with said piston, said first member being disposed outside of said piston rod and being movable along said piston rod in a direction toward said piston under the influence of fluid pressure applied against said first member, said second member being disposed within said piston rod and being movable along said piston rod in a direction away from said piston under the influence of fluid pressure applied against said second member.

6. An apparatus as set forth in claim 1 wherein said first member has a tubular configuration and extends around said second member when said first and second members are disposed in an overlapping relationship.

* * * * *